July 26, 1938.   R. C. FENNER   2,125,069
CUP FOR PACKAGING CONFECTIONS
Filed July 23, 1933
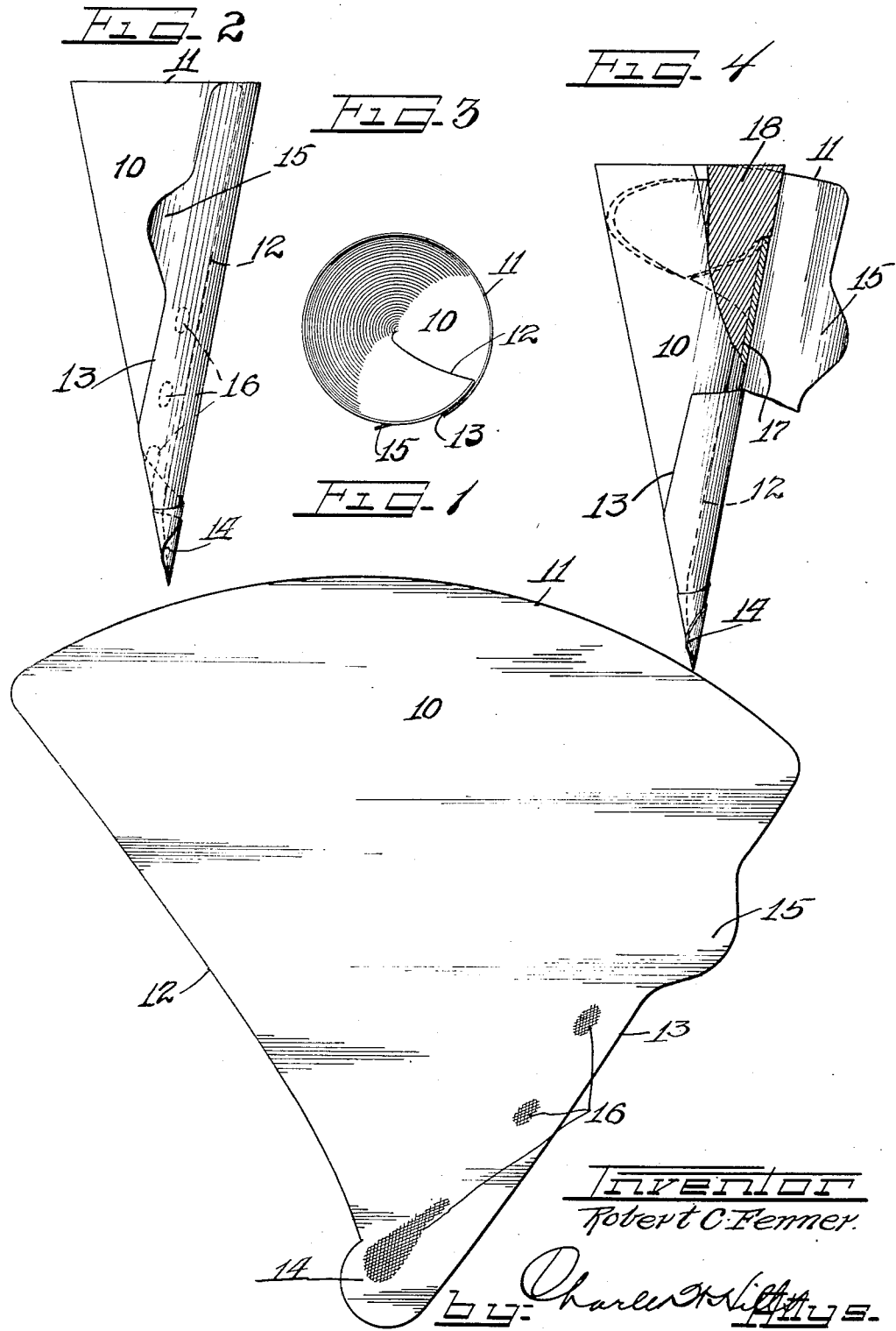

Patented July 26, 1938

2,125,069

UNITED STATES PATENT OFFICE 2,125,069

CUP FOR PACKAGING CONFECTIONS

Robert C. Fenner, Evanston, Ill., assignor to Dixie-Vortex Company, Chicago, Ill., a corporation of Delaware Application July 24, 1933, Serial No. 681,845

6 Claims. (Cl. 99—180)

This invention relates to the packaging of confections and more particularly to a paper cup for a confection such as a conical shell of cake, candy or other confection containing ice cream or the like.

Heretofore, protective covers or wrappers have been utilized in connection with conical shells of candy, cake or other confection, whereby the shells are protected during the handling thereof and when being filled with a charge of ice cream. These protective covers have, in the main, only extended to the top of the conical shell and in some structures have been provided with tongues which extend over the open end of the cone for the purpose of holding the protective covers thereon. With such constructions, it is necessary to bend the tongues back or remove a portion of the cover in order to place a charge of ice cream in the confection shell.

Covers or wrappers of this type have proved objectionable in that they do not protect the ice cream after it has been placed in the shell, and before it is desired to consume the same. This is particularly true where it is desired to provide a supply of charged cones prior to their being dispensed to the trade.

Having the foregoing as well as other objections to the present type of protective covers or wrappers for this purpose, the present invention has for one of its objects the provision of a protective package which not only protects the confection shell but also serves to protect the ice cream extending above the confection shell, irrespective of whether the shells are charged with ice cream beforehand or at the time they are dispensed to the trade.

A further object of the invention is to provide a protective cover or wrapper for a confection shell containing a charge of ice cream or the like, which is so constructed as to enable a portion of the wrapper to be stripped from the confection to enable its consumption, the remaining portion of the cover being left intact to perform its protective function.

It is also an object of the invention to provide a protective wrapper for an ice cream cone, which also serves as a mold and gauge for a charge of ice cream to be placed therein, and which wrapper may be partially stripped to enable consumption of the confection therein.

In accordance with the general features of this invention, there is provided a paper blank adapted to be formed into a conical cup, this blank being segmental in form and having a curved outer edge for defining a circular mouth of the cup and two converging side edges which are adapted to be overlapped when the blank is rolled into a conical cup. Disposed between the apex and the open end of the conical cup is a tear tab for stripping the upper portion of the cup. The overlapped edges are secured together preferably between this tab and the apex by means of an adhesive, while the overlapped edges from the tab toward the open end of the cup are free, thereby facilitating the stripping of the upper portion of the cup. Moreover, this cup is made of such size as to nestingly receive a conical confection shell and have its open end disposed above the open end of this shell. The projecting upper end of the cup above the confection shell enables the cup to serve as a mold when ice cream is placed therein and also as a gauge to show when the proper amount of ice cream is placed therein.

Other objects and features of this invention will more fully appear from the following detail description taken in connection with the accompanying drawing which illustrates a single embodiment thereof, and in which:

Figure 1 is a plan view of a cup blank embodying the features of this invention;

Figure 2 is a view in elevation of a conical cup formed from a blank shown in Figure 1.

Figure 3 is a top plan view of the formed cup; and

Figure 4 is a view in elevation having a broken away portion to disclose the manner in which a confection cone and charge of ice cream or the like are disposed therein, and the manner in which a portion of the cup is stripped to enable consumption of the confection.

As shown on the drawing:

Although the cup or wrapper of this invention is particularly adapted to be utilized in connection with an ice cream cone as illustrated in the drawings, it will be obvious that the invention is not limited to this particular application.

As illustrated in Figure 1, there is shown a blank 10 which may be of any suitable material, such for example, as paper of the type commonly used in paper drinking cups and the like. This blank is in the form of a segment of a circle and has an arcuate or curved outer edge 11 for defining the mouth of the conical cup to be made from the blank. The ends of this curved edge terminate in converging side edges 12 and 13, the latter being substantially a straight edge and the former being curved inwardly a slight amount to facilitate manufacture. Edge 12 may or may not be curved to effect a saving in paper.

The inner extremities of the two converging edges 12 and 13 terminate in a curved extension or tab 14 which is integrally formed with the main body of the cup blank. This extension forms a continuation of the marginal portion adjacent the edge 13 and projects outwardly away from edge 12.

Inwardly spaced from the outer extremities of edge 13 is a projection or tear tab 15 which is likewise integrally formed with the body portion of the blank. This tear tab or projection constitutes a stripping tab for the cup and provides means by which the cup may be partially stripped from an ice cream cone or the like disposed therein when it is desired to consume the same, the remaining portion of the cup being left intact to protect the lower portion of the cone while it is being consumed.

Inasmuch as the paper cup of this invention is especially adapted for use in connection with frozen confections such as ice cream cones or the like, it will be appreciated that it is not necessary to maintain a seal along the entire glued portion of the cup, and accordingly the cup blank is provided along the edge 13 with a plurality of spaced dabs of glue which are designated by the reference numeral 16. These dabs of glue are, it will be observed, preferably discontinued adjacent the inner extremity of the tear tab 15, and the margin of the blank adjacent the tab 15 and the outer extremity of the edge 13 are therefore devoid of the glue.

The cup blank 10, due to its contour and construction, is adapted to be rolled into the form of a conical cup as shown in Figure 2. This rolling operation may be effected by any suitable equipment such, for example, as is now in use in the manufacture of conical paper drinking cups. It will be noted that after the cup blank is formed into a conical cup, the tear tab 15 projects outwardly from the body of the cup at the outer termination of the glued portion of the seam formed by overlapping the edges 12 and 13. Since the upper portion of this seam is devoid of glue, thereby leaving the overlapped edges free, the tear tab 15 is readily accessible for the purpose of pulling it to strip the upper portion of the cup from the confection in the cup. Moreover, the stripping of the upper portion of the cup leaves the lower portion thereof intact so that it may continue to perform its function of protecting the lower portion of the confection from the hands of a person who may be eating the same or handling it. The tab 14 is wrapped around the apex of the conical cup and not only reinforces the lower end or apex of the cup, but also assists in maintaining the cup in its conical form.

Referring to Figure 4, it is preferable to discontinue the gluing of the seam of the cup at a point below the open end of a confection shell of conical form as shown at 17 as being inserted within the conical paper cup. It is also preferable to locate the tearing tab 15 adjacent the termination of the glued portion of the seam so that the stripping of the upper part of the cup may be more readily facilitated. It will be observed that the conical cup of this invention not only serves to protect the conical confection cone 17 but also extends above the open end of this cone so as to protect the frozen confection or ice cream 18 above the conical confection cone. Moreover, the cup of this invention is so constructed and designed that it may be used with a confection cone, where it is desired to insert the frozen confection or ice cream at the time of dispensing it to the trade, or the ice cream may be inserted prior to its being dispensed to the trade. In the latter case, the cone would be charged with ice cream and placed in a cooled compartment until such time as there was a call for an ice cream cone. In either case, when filling the cone with ice cream, the projecting portion of the cup above the confection cone serves as a mold and gauge for the ice cream. When a purchaser of such a cone desires to consume the same, it is only necessary to grasp the tear tab 15 and by giving it a gentle pull the upper portion of the conical cup may be easily stripped to expose the ice cream and the upper portion of the confection cone, the lower portion of the paper cup remaining intact to protect the cone from the hands of the consumer.

It is thought that my novel method of packing a confection will be fully understood from the description of the cup by which the method may be practiced, and accordingly no further description of the method is deemed necessary herein.

Now, I desire it to be understood that although I have illustrated and described in detail the preferred embodiment of the invention, the invention is not to be thus limited but only insofar as defined by the scope and spirit of the appended claims.

I claim as my invention:

1. A protective wrapper for an edible confection having a seam defined by overlapped edges, and a projecting tab on one of said edges disposed between the ends of the seam, the edges on one side of the tab being secured together by an adhesive and the edges on the other side of the tab being free to enable a portion of the wrapper to be stripped without disturbing the protective character of the remaining portion.

2. In combination, a cake shell of conical form adapted to receive a frozen confection in its open end, a conical protective wrapper extending over the outer surface thereof and projecting above the open end of the shell, said wrapper having overlapping edges defining a side seam, the overlapped edges being secured together below the open end of the cake shell and free above the open end of the shell, and a tab projecting from one of said edges below the open end of the shell to enable stripping the portion of the wrapper having the free edges, without disturbing the protective character or the portion having the edges secured together.

3. As an article of manufacture, a blank for a cup adapted to receive a cake cone and a frozen confection comprising a segment of a circle including a curved outer edge for defining the mouth of the cup and converging side edges extending from said outer edge toward the lower end of the cup to be formed from the blank, one of said converging edges being provided with a tear tab between its end extremities and an adhesive along the margin of this edge between the tab and the inner end extremity of that edge, the margin of the blank along the tab and the edge from the tab to the outer end extremity being devoid of adhesive.

4. As an article of manufacture, a blank for a cup adapted to receive a cake cone and a frozen confection comprising a segmental body including a curved outer edge for defining the mouth of the cup, and converging side edges extending from said outer edge toward the lower end of the cup to be formed from the blank, one of the converging edges being provided with a tear tab between its end extremities and an adhesive along the margin of this edge between the tab and the inner end extremity of the edge, the margin of the blank along the tab and the edge from the tab to the outer end extremity being devoid of adhesive, and an extension integral with said body and connecting said converging edges.

5. In combination, an edible shell for the reception of a frozen confection, a protective wrapper formed to nestingly receive said shell and project above the open end of the shell to cooperate therewith in receiving said frozen confection, said wrapper being formed with overlapping marginal portions secured together by an adhesive of such character and location as to maintain the form of the wrapper but being insufficient to preclude the ready stripping of the upper portion of said wrapper from said confection and shell leaving the remainder of the wrapper intact about the lower portion of the shell, said marginal portions being free of adhesive above the upper end of said shell to enable a portion of the wrapper to be stripped without disturbing the protective character of the remaining portion.

6. As an article of manufacture, a cup adapted to receive an edible confection and made from a blank including an outer edge for defining the mouth of the cup and side edges which are overlapped to form a seam in the cup, said side edges being held together by adhesive of such amount and character as merely to hold the cup in shape but being insufficient to preclude ready separation of the side edges when the blank is stripped from a confection therein, said cup being of a conical-like shape so as to enclose an edible cone or the like and being of such length as to extend above the top of the cone so that the upper portion of the cup can serve as a wrapper for ice cream projecting above the top of the cone, said side edges being free of adhesive upwardly from the upper end of said cone to enable a portion of the cup to be stripped without disturbing the protective character of the remaining portion.

ROBERT C. FENNER.